United States Patent

[11] 3,562,599

| [72] | Inventor | David R. Dreitzler |
| | | Huntsville, Ala. |
| [21] | Appl. No. | 783,590 |
| [22] | Filed | Dec. 13, 1968 |
| [45] | Patented | Feb. 9, 1971 |
| [73] | Assignee | the United States of America as represented by the Secretary of the Army. |

[54] CYCLING DELAY CIRCUIT TESTING DEVICE
5 Claims, 2 Drawing Figs.
[52] U.S. Cl.................................................. 317/142,
317/148.5; 307/132
[51] Int. Cl...................................................... H01h 47/32
[50] Field of Search............................................ -
317/148.5TD, 142

[56] References Cited
UNITED STATES PATENTS
| 3,287,608 | 11/1966 | Pokrant........................ | 317/142 |
| 3,303,396 | 2/1967 | Culbertson.................... | 317/142 |
| 3,125,707 | 3/1964 | Culbertson.................... | 317/142 |

Primary Examiner—Lee T. Hix
Assistant Examiner—C. L. Yates
Attorneys—Harry M. Saragovitz, Edward J. Kelly, Herbert Berl and Harold W. Hilton ABSTRACT: A voltage cycling testing device for a delay circuit. A unijunction relaxation oscillator delivers a trigger pulse to a monostable multivibrator which activates a relay to apply power to a circuit under test. The unijunction transistor is activated periodically for a predetermined time period by a resistance-capacitance network. The relay is deactivated each time the multivibrator switches back to its stable state.

David R. Dreitzler,
INVENTOR.

BY Harry M. Saragovitz
Edward J. Kelly
Herbert Berl
Harold W. Hilton

CYCLING DELAY CIRCUIT TESTING DEVICE

BACKGROUND OF THE INVENTION

In measuring the effect of various environmental conditions on prospective circuits, it is necessary to test the circuits repeatedly in the environment of interest or a simulated environment thereof. A circuit designed to be used only once must be repeatedly tested and yet approach one shot test results during each test. Therefore, after each test the circuit must be allowed to stabilize before additional tests. These and other similar and related problems are overcome by applicant's invention.

SUMMARY OF THE INVENTION

The apparatus of the present invention is an electrical circuit for periodically opening and closing an electrical path to an external circuit for a predetermined time interval. A triggering means is activated periodically by a charging and discharging device to provide an output signal pulse when the device is discharging. This output pulse activates a monostable switching circuit which will switch from a relative passive state to an active state for a controlled predetermined time before switching back to the stable or passive state. During the active state of said switching circuit, an output load is energized which closes electrical contacts in an external circuit for the duration of the active state.

DESCRIPTION OF THE PREFERRED EMBODIMENT

Figure 1:
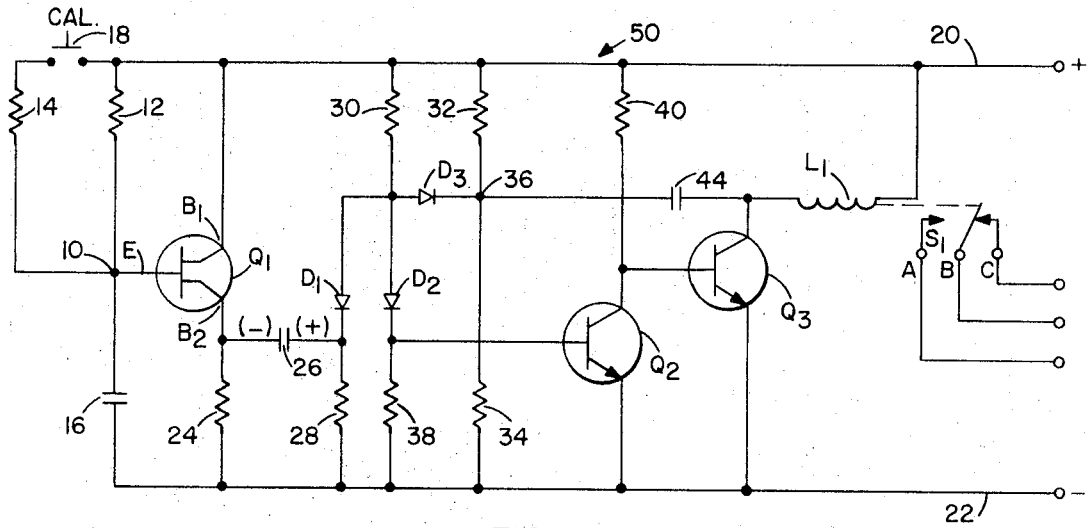
FIG. 1 is a schematic of the cycling testing device.

Referring now to the drawings, like numbers represent the same component in each FIG. FIG. 1 discloses a preferred embodiment of the present invention. A unijunction transistor $Q_1$ has the emitter E thereof connected to a common point 10 between the resistance and capacitance of on RC network. Common point 10 is connected through a resistance 12 to the positive input lead 20 of a power source and through another resistance 14 to one side of a calibration switch 18, the positive power source being connected through lead 20 to the other side of switch 18 such that depression of switch 18 will connect resistances 12 and 14 in parallel. Common point 10 connects through a capacitance 16 to a negative input lead 22 of said power source. Elements 12, 14, and 16 comprise the RC network and any one or all of the components may be variable to allow ready adjustment in the charge and discharge time of capacitance 16.

A first base of $Q_1$ is connected to positive lead 20 and a second base $B_2$ is connected through a resistor 24 to negative lead 22. Base $B_2$ is further connected through a capacitor 26 to a resistor 28 and to the cathode of a diode $D_1$. The other side of resistor 28 is connected to lead 22. A pair of diodes, $D_2$ and $D_3$, have the anodes thereof connected in parallel with the anode of $D_1$ and through a resistor 30 to lead 20. Lead 20 is connected through a series connected pair of resistors 32 and 34 to lead 22, the cathode of $D_3$ being connected in common with both resistors at a point 36. A resistor 38 is connected between the cathode of $D_2$ and negative lead 22. A pair of NPN transistors $Q_2$ and $Q_3$ have the emitters thereof connected to lead 22. The base of $Q_2$ is connected to the cathode of $D_2$ and is responsive to a signal thereon to cut on or off. The collector of $Q_2$ is connected to the base of $Q_3$ and through a resistor 40 to positive lead 20. The collector of $Q_3$ is connected through a load coil or electromagnetic relay $L_1$ to lead 20. A capacitor 44 is connected between the cathode of $D_3$ and the collector of $Q_3$ to initiate current flow through $Q_3$ when it becomes active. Coil $L_1$ may have a plurality of contacts responsive thereto to initiate signals in external circuitry. Contacts A, B, and C of a switch $S_1$ are indicative of one set of break-make contacts that form a part of relay $L_1$. In the deenergized or inactive state of $L_1$, contacts B—C are closed. In the activated state of $L_1$, contacts A—B are closed by the effect of $L_1$ on switch blade B, thus opening contacts B—C.

Figure 2:
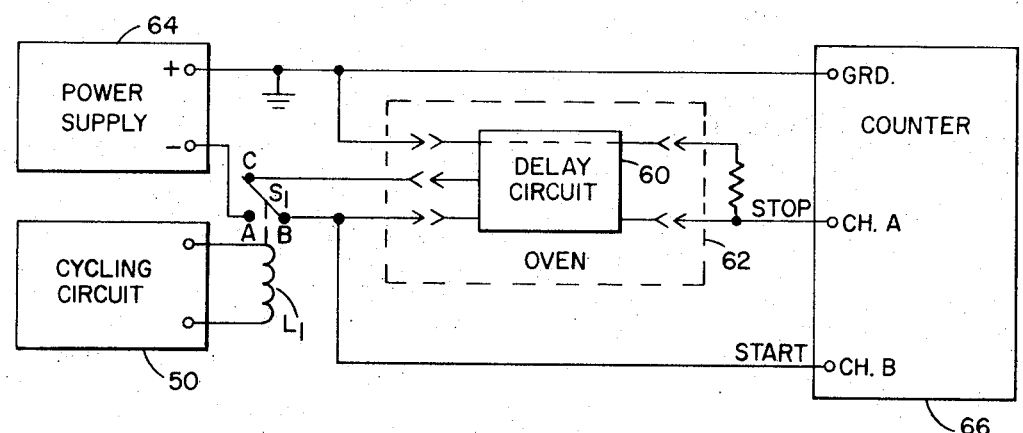
FIG. 2 is a circuit diagram of the testing device operating with external circuitry.

FIG. 2 discloses a typical circuit employing the characteristics of applicant's cycling testing device. Cycling circuit 50 includes all of the circuitry of FIG. 1 with the exception of $L_1$ and $S_1$. Electromagnetic relay $L_1$ and the related switch $S_1$ are shown external to circuit 50 to more clearly indicate the composite circuit function thereof. A delay circuit 60 is tested periodically in an environmental oven 62. A power supply 64 has a common lead or ground connected to the delay circuit and to a counter circuit 66. Switch $S_1$ normally maintains delay circuit 60 shorted or deactivated through contacts B—C. However, when $L_1$ activates, a negative pulse is supplied from power supply 64 through contacts A—B to delay circuit 60 and counter 66. Counter 66 indicates that a triggering pulse has been supplied to delay circuit 60 and when the delay circuit 60 fires or activates, an output therefrom stops counter 66 to indicate that circuit 60 has fired. Coil $L_1$ may or may not reset before circuit 60 fires. This depends on the design of the particular circuit 60 that is under test. After $L_1$ deenergizes, cycling circuit 50 is dormant for a predetermined interval to allow delay circuit 60 to become stable, after which, $L_1$ is again triggered to repeat the process. This may be continued under various environmental conditions to determine the reliability of delay circuit 60 or other similar type circuitry.

The function of the voltage cycling testing device 50 has been discussed with a typical circuit. Additional switching contacts (not shown) of $L_1$ may be used to trigger similar or related circuitry, and give an audible or visible indication of activation or deactivation of $L_1$. The actual operation of circuit 50 may readily be understood from the following description while referring to FIG. 1.

A power source (not shown) supplies direct current power to leads 20 and 22. Initially the circuit is completely dormant. When power is supplied capacitors 16 and 44 begin to charge. The charge path for capacitor 44 is through coil $L_1$ and resistor 34. The charge current through $L_1$ is not sufficient to energize the coil. Resistor 32 is a relatively large impedance which has little effect on the charge across capacitor 44. Capacitor 26 is simultaneously charged through resistor 30, diode $D_1$ and resistor 24. The potential developed almost immediately across resistor 38, due to current flow through $D_2$, coupled with a low impedance resistor 40 allows $Q_2$ to conduct which places an effective negative potential on the base of $Q_3$, thus blocking conduction of $Q_3$. The circuit may be considered to be in a stable state with $Q_2$ conducting, capacitors 44 and 26 charged, and capacitor 16 still slowly charging.

Base $B_2$ of $Q_1$ is at an effective negative potential when capacitor 26 is charged, while current continues to flow through all three diodes and associated resistors 28, 38, and 34 respectively. When the charge on capacitor 16 is sufficient to break down the barriers between E and $B_2$, unijunction transistor $Q_1$ conducts. Capacitor 16 discharges through resistor 24 and capacitor and resistor 26 and 28, placing a high positive-to-negative charge across capacitor 26 with $B_2$ being the positive side. When capacitor 16 is discharged to the cutoff point of $Q_1$, $Q_1$ turns off leaving capacitor 26 charged opposite to that shown and thereby placing a high negative potential on the cathode of $D_1$. High current flows through resistor 30 and diode $D_1$ thereby reducing substantially the voltage on the base of $Q_2$, which drives $Q_2$ toward cutoff. Positive increase on the base of $Q_3$ drives $Q_3$ toward saturation and the initial current through $Q_3$ is supplied by capacitor 44. $L_1$ begins to conduct through $Q_3$ sufficiently to energize and closes contacts A—B of switch $S_1$. When capacitor 44 is discharged, the current through $L_1$ is not sufficient to maintain conduction through $Q_3$, and the potential on the base of $Q_2$ has risen due to reduction of charging current for capacitor 26 through $D_1$. Transistor $Q_3$ will cutoff and $Q_2$ will begin conduction again. Relay $L_1$ will deenergize and capacitor 44 will recharge. Capacitor 16 will gradually recharge to again trigger the circuit. This process will recur until the power is removed from circuit 50.

Resistor 32 serves as a drain for coil $L_1$ after $Q_3$ has stopped conducting, thereby absorbing any switching transients from $L_1$. Resistor 14 is employed to speed up operation of the resistance-capacitance circuit without changing the value of elements 12 and 16. When a faster circuit operation is temporarily desired, switch 18 is momentarily depressed to allow faster charging of capacitance 16. Other components may be readily made variable, as for example, capacitor 44. Just as the resistance-capacitance network comprising elements 12, 14, and 16 allow an adjustable charge and trigger time, capacitor 44 can be varied to control the active time of $Q_3$ and thus the energized time of $L_1$.

Although a particular embodiment and form of this invention has been illustrated, it is obvious to those skilled in the art that modifications may be made, similar to those suggested above, without departing from the scope and spirit of the foregoing disclosure. Therefore it is understood that the invention is limited only by the claims appended hereto.

I claim:

1. A voltage cycling testing device comprising a direct current power source; a resistance-capacitance charging means responsive to said power source for accruing a potential therein; triggering means having an input responsive to a certain potential in the charging means to cause the trigger means to discharge the potential of the charging means through an output of the trigger means; switching means connected across said power source and having an input and an output; said switching means including first and second transistors, and first, second, and third diodes; said transistors having the emitters thereof connected to a negative side of said power source; the anodes of said diodes being connected in common and through a first resistor to a positive side of said power source; the cathode of said first diode being the input of said switching means and being connected to the output of said triggering means; the cathode of said second diode being connected to the base of said first transistor and through a second resistor to said negative power source, the cathode of said third diode being connected through a third resistor to said negative power source and through a fourth resistor to said positive power source; the collector of said first transistor being connected to the base of said second transistor and through a low impedance to said positive power source; the collector of said second transistor being the output of said switching means; and a load responsive to said switching means for providing an output signal therefrom.

2. A testing device as set forth in claim 1 wherein said load is connected between the collector of said second transistor and said positive power source, and a capacitor is connected between said second transistor collector and the cathode of said third diode.

3. A testing device as set forth in claim 2 wherein said low impedance is a resistor; said resistance-capacitive network has the resistance thereof connected on one side to said positive power source and the capacitance thereof connected on one side to said negative power source, a common point between said resistance and capacitance being connected to said triggering means input.

4. A testing device as set forth in claim 3 wherein said load is an electromagnetic relay having a plurality of break-make contacts responsive to the operation thereof to activate and deactivate a plurality of external circuits.

5. A testing device as set forth in claim 3 wherein said load is an electromagnetic relay having a break-make contact responsive to the operation thereof to create an electrical path to an external circuit for a predetermined time interval.